2,983,713
Patented May 9, 1961

2,983,713
POLYPROPANESULTAM AND PROCESS FOR ITS PREPARATION

William H. Libby, St. Paul, Minn., assignor to Minnesota Mining and Manufacturing Company, St. Paul, Minn., a corporation of Delaware No Drawing. Filed Apr. 21, 1958, Ser. No. 729,547

9 Claims. (Cl. 260—79.3)

This invention relates to polymers and more particularly to polypropanesultam and to a process for its preparation.

While cyclic sultams such as 1,3-propanesultam have been described, there has been no suggestion heretofore of any way in which these compounds could be polymerized, and polymers prepared from cyclic sultams have apparently not been heretofore known.

It is an object of this invention to provide water-insoluble polymers from 1,3-propanesultam. It is a further object of the invention to provide a process for the preparation of polypropanesultam. Other objects of the invention will become apparent from the disclosure hereinafter made.

In accordance with the objects of this invention, there is prepared from 1,3-propanesultam having the formula:

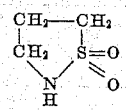

a polymer which is believed to be comprised of a skeletal chain containing recurring units represented by the formula:

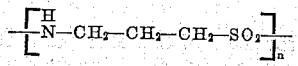

wherein $n$ is an integral number. It is understood that a given preparation of polymer will usually contain several molecular species in each of which $n$ has an integral value.

Broadly speaking, the novel process of the invention whereby the polypropanesultam of the present invention is formed comprises polymerizing 1,3-propanesultam in the presence of from about 1 to about 40 mole percent of a strongly basic salt-forming catalyst and about 0.005 to about 5 mole percent of an acyl-type initiator as hereinafter more fully described. The process is carried out by mixing the components of the polymerization reaction and maintaining the mixture at the selected temperature until the desired degree of polymerization has occurred.

The strongly basic catalysts which are employed are alkaline materials which are exemplified by the alkali metals and derivatives thereof, such as hydroxides, hydrides, alkoxides or oxides of the alkali metals, lithium, sodium, potassium, rubidium or cesium or their equivalents, as well as organic quaternary ammonium bases. In all cases these basic substances are believed to react with 1,3-propanesultam to form the salt

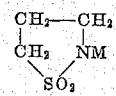

wherein M is a strongly positive cation, for example an ion of the named metals or a substituted quaternary ammonium ion. If desired, the salt can be prepared in advance and added in the required amounts. Thus, potassium 1,3-propanesultam is a white powdery material which darkens without melting when heated above 200° C. It is stable in the absence of moisture and can be employed as the catalyst for this reaction.

Broadly speaking, the basic salts of propanesultam are formed by reaction of 1,3-propanesultam, with or without a diluent, with the active metal or with the metallic or organic hydroxides and recovering the salt as by removing water and concentrating the resulting solution to dryness either by evaporation or by codistillation with a suitable solvent.

Although polymerization of 1,3-propanesultam is possible when only an alkaline catalyst such as a salt of propanesultam is employed, e.g. the salts prepared as set forth hereinabove with strongly basic substances, it is advantageous to employ a highly purified monomer and to add both the basic catalyst and an acyl-type initiator such as those more fully described hereinafter, in order to obtain better conversions to polymer at lower average temperatures or shorter reaction times. It is also found desirable to provide anhydrous conditions of reaction and to polymerize under conditions which exclude oxygen, although these several conditions appear to have the effect mostly of facilitating the reaction rather than being critical.

The acyl-type initiators which can be employed in the polymerization process of the invention are exemplified by benzenesulfonyl chloride, butanesulfonyl chloride, acetyl chloride, acetic anhydride, phenyl isocyanate and the like acylating agents; and by N-acyl sultams and N-acyl lactams, such as N-carboxy-acyl, N-sulfonyl or N-carbamyl derivatives of propanesultam, for example N-acetyl-1,3-propanesultam, N-benzenesulfonyl-1,3-propanesultam and N-(phenylcarbamyl)-1,3-propanesultam; and N-acetyl pyrrolidone, N,N'-adipoyl dipyrrolidone, and the like. The acylating agents appear to react with the 1,3-propanesultam metal salt to form the corresponding acyl derivatives, which probably are the effective initiators.

It will be understood that the term acyl-type initiator includes all the above and is not restricted to any one of the several types mentioned which may differ in the mode or efficacy of reaction.

When acylating agents capable of reaction with the monomer are used, the polymerization is believed to be initiated as follows, for example, as shown in the following series of reactions using N-benzenesulfonyl-1,3-propanesultam as the initiator and the potassium salt of propanesultam as the catalyst:

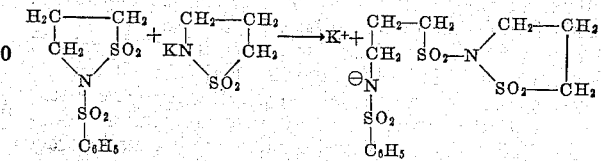

The potassium ion and the addend then react with a further molecule of sultam to give

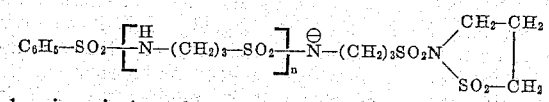

wherein $n$ is 1, and potassium ion. Successive reactions then may occur in the same manner so that $n$ becomes 2, 3, 4, etc. until the polymerization is terminated.

Temperatures at which the polymerization is effected vary between about 25° and 250° C. with a preferred range of about 75° to about 130° C. The time necessary for substantial polymerization varies inversely with the temperature; as little time as 5 minutes may suffice for extensive polymerization at 250° C. whereas three or more days may be necessary at room temperature. In general, a period of about 1 to 48 hours is sufficient to achieve a useful degree of polymerization. In connection with time and temperatures employed, consideration must also be given to the concentration of acyl-type initiator used. It is generally preferable to use from about 0.1 to about 0.7 mole percent of acyl-type initiator, based on the amount of propanesultam present, in conjunction with a temperature of about 75° to about 130° C. and a time of about 1 to about 48 hours. The concentration of basic catalyst should be at least as great as that of the acyl-type initiator and preferably is greater, ranging upwards of about one mole percent. The polymer which is produced is a hard, white solid, which can be fabricated by molding, extrusion from the molten state and the like to yield films, fibers and the like.

While, in general, it is preferred that solid polymers be prepared, which can be used to produce various structures by melt-fabrication, lower polymers, which may even be viscous liquids having relatively low softening points, can be used as prepolymers or the like.

Having thus described the new process for polymerization in general, it is now illustrated more specifically by examples intended to show the best mode contemplated of practicing the invention but without thereby limiting the scope thereof. In these examples all parts are by weight. Inherent viscosities are determined in dimethyl sulfoxide, the concentration of the polymer in grams per 100 ml., designated C, being expressed as percentage unless otherwise stated.

Example 1

Ten parts of 1,3-propanesultam (prepared by heating 3-chloro-1-propanesulfonamide with sodium hydroxide for two hours in refluxing ethanolic solution) and 0.33 part of potassium metal (corresponding to 10 mole percent of the monomer) are heated together under 0.05 to 0.1 millimeter of mercury pressure at 95° to 120° C. for about 6 hours. This phase of the reaction insures anhydrous conditions. Anhydrous nitrogen gas (dried over anhydrous calcium sulfate) is then bubbled through the slightly yellowish, hot (about 112–5° C.) solution to displace dissolved oxygen and furnish anaerobic conditions. About 0.05 part of benzenesulfonyl chloride (0.35 mole percent of monomer) is added to and mixed with the charge of anhydrous 1,3-propanesultam as an initiator of the polymerization, which commences immediately. Within ten minutes the mass has become a substantially solid gel which is heated at 112–5° C. for one hour longer and then cooled. By extracting the solid reaction mixture with water a slightly tan powder remains which, after drying, has a melting point (determined on the Fisher-Johns apparatus) of about 250° C. This is poly-1,3-propanesultam.

Polypropanesultam thus prepared is a light-colored solid which is insoluble in water and in most organic solvents, but dissolves in dimethylsulfoxide to the extent of about 15 percent. A 1.10 percent solution in dimethylsulfoxide is employed for determining the inherent viscosity by the method described in Billmeyer, "Textbook of Polymer Chemistry," Interscience Publishers Inc., New York, N. Y. (1957), pages 128 to 131. The inherent viscosity is found to be 0.38. This is believed to correspond to a molecule including about 25 monomer units. By heating the powdered polypropanesultam between hot platens at about its melting point, it is moldable to form sheets.

Example 2

Five parts of 1,3-propanesultam and 0.5 part of 50 percent aqueous potassium hydroxide (corresponding to about 10 mole percent of the monomer) are combined in a flask and heated at about 130° C. at about 0.05 mm. of mercury pressure to remove water. Heating is continued for 24 hours at this temperature, after which time the reaction mixture has become substantially solid. By working up the solid as described in Example 1, polypropanesultam is obtained having a melting point of about 250° and inherent viscosity at 1.083 percent concentration in dimethyl sulfoxide of 0.17.

Repetition of this procedure using 0.1 part of 50 percent aqueous potassium hydroxide (corresponding to about 2 mole percent of the monomers) gives a somewhat smaller yield of polymer melting about 248° C.

When 13 mole percent of sodium hydride is employed, thereby avoiding the formation of water, and polymerization is carried on for about 1 hour at about 135° C., the polymer formed has a melting point of about 255° C. and inherent viscosity of 0.30 (C.=1.066 percent).

Example 3

A mixture of 5 parts of 1,3-propanesultam, 0.5 part of 50 percent aqueous potassium hydroxide and 10 parts of xylene is heated under reduced pressure so that xylene and water codistil, until water is no longer visible in the distillate. Distillation is then continued to remove the remainder of the xylene, and 0.5 part (about 0.35 mole percent of the monomer) of benzenesulfonyl chloride is added as an initiator. Polymerization commences almost immediately and the reaction mixture is heated with the exclusion of air and water for about one hour at 115° C. and worked up as set forth in Example 1 to furnish polypropanesultam having a melting point of about 252° C. and inherent viscosity of about 0.17 (C.=0.966 percent).

When this procedure is repeated, except that different proportions of potassium hydroxide and different times of reaction are employed, polypropanesultam having the characteristics shown in the following table are obtained:

| Mole percent potassium hydroxide | Time (hours) | M.P.,° C. | Inherent viscosity |
| --- | --- | --- | --- |
| 1 | 24 | 180 | Low yield. |
| 5 | 24 | 250 | 0.22 (C.=0.981 percent). |
| 10 | 24 | 250 | 0.20 (C.=1.056 percent). |
| 20 | 1.5 | 253 | 0.23 (C.=1.095 percent). |

When the procedure of this example is repeated using about 40 parts of xylene as a diluent during the polymerization and heating for about 9 hours, the polymer formed is comparable in properties. When 10 parts of heptane are used as the diluent and the polymerization is permitted to proceed for about 16 hours at about 25° C., the resulting polymer has an inherent viscosity of about 0.1 (C.=1.07 percent).

When the procedure of this example is repeated without the exclusion of water and air, employing 15 mole percent of potassium hydroxide and 2.5 parts (1.75 mole percent) of benzenesulfonyl chloride, at a reaction temperature of about 230° C. for about 5 minutes, polypropanesultam is obtained which has a melting point of about 230° C. and an inherent viscosity of about 0.09 (C.=1.27 percent).

It is apparent from the preceding examples that considerable latitude is possible in polymerization conditions. In the above examples the monomer was sufficiently pure to permit polymerization but it has been found advantageous to subject it to further purification, suitably by distilling the propanesultam from a strongly basic material such as an alkali metal or an alkali metal hydride, hydroxide, oxide or alkoxide. Thus, about 2.5 percent by weight of clean sodium metal is dissolved in 1,3-propanesultam and the resulting solution is distilled at 105° to 110° C. and 0.03 mm. of mercury pressure, the distillate, consisting of purified 1,3-propanesultam, being collected. The following examples illustrate polymerizations in which this redistilled sultam is employed.

Example 4

A mixture of ten parts of sodium-treated, redistilled 1,3-propanesultam and 20 parts of xylene is heated under reduced pressure until the xylene has distilled; and 0.17 part (corresponding to 5 mole percent of the monomer) of potassium metal is then dissolved in the dry monomer. When all of the potassium metal is in solution, 0.14 part (1 mole percent) of benzenesulfonyl chloride is added as an initiator and the polymerization is continued for about 24 hours at about 106° C. The resulting reaction mixture is worked up as heretofore described to furnish a moldable, substantially white, powdery polypropanesultam having a melting point of about 250° C. and inherent viscosity of 0.44 (C.=1.018 percent). When the procedure is repeated using 1,3-propanesultam which has not been purified, the polymer is obtained in lower yield and with lower inherent viscosity.

This procedure is repeated at other temperatures but permitting polymerization to proceed for 60 hours to give polymers characterized as follows:

| Reaction temperature, ° C. | M.P. of polymer, ° C. | Inherent viscosity |
| --- | --- | --- |
| About 102 | 250 | 0.31 (C.=1.055 percent). |
| About 25 | 236 | 0.08 [1] (C.=1.153 percent). |

[1] Low yield of polymer is obtained.

This procedure is also repeated using smaller amounts of initiator and permitting polymerization to proceed for 24 hours with the following results:

| Mole percent initiator | Reaction temperature, ° C. | M.P. of polymer, ° C. | Inherent viscosity |
| --- | --- | --- | --- |
| 0.5 | About 103 | 251 | 0.42 (C.=1.045 percent). |
| 0.1 [1] | About 102 | 255 | 0.26 (C.=1.060 percent). |

[1] Low yield of polymer is obtained.

When polymerization proceeds for 30 hours at about 98° C., using 1 mole percent of butanesulfonyl chloride, the polypropanesultam which is obtained in excellent yield melts at about 250° C. and has an inherent viscosity of 0.29 (C.=0.671 percent).

*Example 5*

N-benzenesulfonyl-1,3-propanesultam is prepared by reacting a suspension of 10 parts of 1,3-propanesultam and 100 parts of benzene in 23.3 parts of 20 percent aqueous potassium hydroxide solution with 14.6 parts of benzenesulfonyl chloride. The product is isolated by filtering and washing the white, crystalline precipitate which then melts at about 165° C.

The procedure of Example 4 is repeated using various amounts of N-benzenesulfonyl-1,3-propanesultam as the acyl-type initiator, the duration of polymerization being about 24 hours, at the average reaction temperatures and with the results tabulated below:

| Mole percent initiator | Average temperature, ° C. | M.P. of polymer, ° C. | Inherent viscosity | Yield |
| --- | --- | --- | --- | --- |
| 0.05 | 102 | 260 | 0.29 (C.=0.658 percent) | Very low. |
| 1 | 105 | 252 | 0.27 (C.=1.046 percent) | Good. |
| 3 | 99 | 258 | 0.22 (C.=0.972 percent) | Excellent. |

When the amount of potassium used as the catalyst is increased to 40 mole percent there is an increase in melting point and inherent viscosity of the polymer, but no improvement in yield. It is found that it requires two weeks at about 25° C. to dissolve this high proportion of potassium metal.

When other catalysts are employed, using 1 mole percent of N-benzenesulfonyl-1,3-propanesultam, the following results are obtained:

| Catalyst | Average reaction temperature, ° C. | M.P. of polymer, ° C. | Inherent viscosity | Yield |
| --- | --- | --- | --- | --- |
| 10 mole percent lithium metal. | 95 | 250 | 0.22 (C.=0.791 percent) | Moderate. |
| 4.5 mole percent cesium metal. | 100 | 250 | 0.23 (C.=0.650 percent) | Do. |
| 5 mole percent potassium sultam. | 105 | 258 | 0.35 (C.=1.075 percent) | Good. |

It is found that lithium reacts rather slowly with the sultam.

The preceding examples illustrate the use of derivatives of sulfonic acids as initiators, with the exception of Example 2 in which no acyl-type initiator was added. The following example illustrates the use of carboxylic acid derivatives as initiators.

*Example 6*

Ten parts of 1,3-propanesultam (not redistilled from sodium) is reacted with 0.17 part (5 mole percent) of potassium metal as described in Example 4. To the mixture is added 0.067 part (1 mole percent) of acetyl chloride. Polymerization begins immediately and continues while the reaction mixture is heated at about 100° C. for 24 hours. The mixture is then worked up as described above to furnish polypropanesultam as a white, moldable powder melting at about 261° C. and having inherent viscosity of 0.48 (C.=0.712 percent).

This procedure is repeated, using 1,3-propanesultam which has been sodium-treated and redistilled, first using 1 mol percent of acetyl chloride and then using 1 mole percent of acetylpyrrolidone as the acyl-type initiators. Average temperatures, times and characteristics of the resulting polypropanesultam are as follows:

| Initiator | Average reaction temperature, ° C. | Time (hrs.) | M.P. of polymer, ° C. | Inherent viscosity |
| --- | --- | --- | --- | --- |
| Acetyl chloride | 104 | 24 | 262 | 1.84 (C.=0.608 percent). |
| Acetylpyrrolidone | 97 | 21.5 | 254 | 1.73 (C.=0.131 percent). |

Purification of the propanesultam can also be achieved by recrystallization at low temperatures. For this purpose it is necessary to employ solvents or mixtures thereof which have very low melting points since, unlike 1,4-butanesultam which melts at about 110° C., 1,3-propanesultam has a melting point of about 23° C. A mixture of anhydrous ether and chloroform is found to be particularly convenient for this purpose. Thus, 8.5 parts of 1,3-propanesultam is dissolved in a mixture of 106 parts of anhydrous ether and 149 parts of dry chloroform and cooled to −75° C. At this temperature much of the propanesultam is present as pure white needles. It is collected on a precooled filter and dried in vacuo at about 15° C. The purified 1,3-propanesultam melts at about 23° C. It is polymerized in 24 hours at 100° C. by the above procedure using the concentrations of acetyl chloride stated in the following table as initiators, with the results shown:

| Mole percent acetyl chloride | M.P. of polymer | Inherent viscosity |
| --- | --- | --- |
| 0.1 | 260 | 0.91 (C.=0.291 percent). |
| 0.5 | 260 | 0.77 (C.=0.268 percent). |
| 1.0 | 260 | 0.40 (C.=0.283) percent. |

It is found that the yields increase with increasing concentration of initiators.

The process of this invention is not restricted to the use of monofunctional acyl-type initiators of the type hereinabove described, but includes also polyfunctional initiators as shown in the following example.

*Example 7*

The procedure of Example 6 is repeated using 10 parts of recrystallized 1,3-propanesultam and 0.093 part (0.25 mole percent of monomer) of m-benzenedisulfonyl-bis (1,3-propanesultam) (prepared by the procedure described in Example 5 for benzenesulfonyl propanesultam). After heating the reaction mixture at 100° C. for 24 hours and working up as above, polypropanesultam is obtained having a melting point of about 260° C. and inherent viscosity of 0.81 (C.=0.362 percent).

The polypropanesultam polymers of the present invention as produced herein are inert to most solvents and chemical reagents and are heat-stable. They are soluble in dimethyl-formamide, dimethyl sulfoxide, concentrated sulfuric acid and 10 percent aqueous sodium hydroxide, but are insoluble in water, alcohols, ketones, ethers, aliphatic and aromatic hydrocarbons, esters, organic acids and amines.

As is evident from the preceding examples, they possess melting points of about 250° to 260° C. unless the molecular weight is very low. Polymers melting in this range are useful for the production of filaments, fibers and films.

It is found that lower molecular weight polymers, having inherent viscosities of about 0.1 to about 0.8, are useful as film-forming ingredients in coatings for metals although this utility is not limited to this range of molecular weights. For example, the polymer is conveniently dissolved in dimethyl sulfoxide and, if desired, plasticizers and other adjuvant materials are added, and the mixture is applied as a coating by brushing or spraying, for example, to an aluminum surface. On drying, it is found that the polymer has formed an adherent, transparent, water-resistant coating having good protective properties against corrosion.

The higher molecular weight polymers having inherent viscosities above about 0.6 are found to be spinnable. For example, the polymer is melted and a glass rod is touched to the surface and withdrawn giving a flexible, orientable filament. The characteristics of the filament thus obtained are found to be dependent to some extent upon the molecular weight of the polymer and polypropanesultams having inherent viscosities above about 0.6 are particularly preferred for this application.

*Example 8*

Polypropanesultam is formed by heating a solution of 0.16 part of metallic potassium (5 mole percent of monomer) and 0.0065 part of acetyl chloride (0.1 mole percent) in 10 parts of propanesultam (previously dried by distillation therefrom of 17 parts of xylene at about 15 mm. Hg pressure) for 72 hours at 100° C. The water-insoluble polypropanesultam which is isolated and dried by the procedure set forth hereinabove melts at about 260° C. and has an inherent viscosity of 0.76 (C.=0.340 percent). When heated for 1 hour at 250° C. under about $10^{-2}$ mm. Hg pressure the polymer loses less than 3 percent in weight and the inherent viscosity is decreased by less than 10 percent. These results show the excellent thermal stability of polypropanesultam.

The polypropanesultam is extruded through a 25 mil orifice at about 290° C. and after passage through air for 16 inches is wound up at a rate of 50 meters per minute to give a 9.2 denier unoriented fiber having a specific gravity of 1.45. This fiber is oriented by drawing cold to three times its original length. The properties of the unoriented and oriented fibers are determined on an Instron tester at a cross-head speed of 2 inches per minute. The tensile properties are calculated and are given in the following table:

| Fiber | Tenacity, grams per denier | Elongation, percent | Initial modulus, grams per denier |
| --- | --- | --- | --- |
| Unoriented | 1.6 | 203 | 47 |
| Oriented | 3.3 | 43 | 36 |

The polymers of the invention are further capable of forming self-sustaining films. Thus, the above polypropanesultam is molded between heated platens under pressure at about 255° C. and then cooled to produce a clear, flexible, transparent, self-sustaining film having excellent dimensional stability (1.4 percent water absorption at 50 percent relative humidity) and tensile strength of about 5500 p.s.i. It is found that polypropanesultam polymers having inherent viscosities above about 0.6 form self-sustaining films by this procedure and can be molded to form solid objects by use of suitable dies.

Similar film-forming properties are exhibited by the polymer produced in the following example, employing a strong organic base as the catalyst.

*Example 9*

A mixture of 3 parts of 1,3-propanesultam distilled from sodium metal, 1.13 parts of a 10 percent aqueous solution of tetramethylammonium hydroxide (5 mole percent) and 6 parts of xylene (boiling point 137° to 140° C.) is distilled at about 18 mm. Hg pressure to codistil xylene and water. Dry nitrogen (oxygen free) is bubbled through the residue and 0.02 part (one mole percent) of acetyl chloride is added as the initiator. The mixture is heated at about 100° to 102° C. for 24 hours. At the end of this time the solid cake formed is washed thoroughly with warm water and dried. The product polypropanesultam is obtained as a slightly yellowish solid melting at about 258° C. and having inherent viscosity (C.=0.397 percent in dimethyl sulfoxide) of 0.283.

*Example 10*

The procedure of Example 6 is repeated using 10 parts of recrystallized 1,3-propanesultam and 0.05 part (0.5 mole percent of monomer) of phenylisocyanate as the acyl-type initiator. After heating the reaction mixture at 100° C. for 24 hours and working up as in Example 6, polypropanesultam is obtained having a melting point of about 262° C. and inherent viscosity of 0.46 (C.=0.295 percent).

When the procedure of this example is repeated using 0.03 part (0.3 mole percent) of phenylisocyanate, an excellent yield of polypropanesultam melting at about 262° C. and having an inherent viscosity of 0.84 (C.=0.332 percent) is obtained.

What is claimed is:

1. Solid polypropanesultam melting at about 250 to 260° C.

2. The process for producing polypropanesultam, which comprises heating 1,3-propanesultam to a temperature in the range of about 25 to 250° C. in the presence of a catalytic amount of a strongly alkaline catalyst chosen from the group consisting of alkali metals and their hydroxides, hydrides, alkoxides and oxides, organic quaternary ammonium bases, and alkali metal and organic quaternary ammonium base salts of 1,3-propanesultam.

3. The process for producing polypropanesultam, which comprises heating 1,3-propanesultam to a temperature in the range of about 25 to 250° C. in the presence of a catalytic amount of an alkali metal salt of 1,3-propanesultam.

4. The process for producing polypropanesultam, which comprises heating 1,3-propanesultam to a temperature in the range of about 25 to 250° C. in the presence of a catalytic amount of a salt of 1,3-propanesultam of the class consisting of alkali metal and organic quaternary ammonium base salts of propanesultam.

5. The process for producing polypropanesultam, which comprises heating 1,3-propanesultam to a temperature in the range of about 25 to 250° C. with from about 1 to 40% of a basic catalyst for the polymerization chosen from the group consisting of alkali metals, and their oxides, hydrides, alkoxides and hydroxides, organic quaternary ammonium bases, and alkali metal and organic quaternary ammonium base salts of 1,3-propanesultam.

6. The process for producing polypropanesultam, which comprises heating 1,3-propanesultam to a temperature in the range of about 25 to 250° C. in the presence of a catalytic amount of a compound chosen from the group consisting of alkali metal and organic quaternary ammonium base salts of 1,3-propanesultam and from 0.1 to 0.7 mole percent, based on the amount of 1,3-propanesultam present, of an acyl-type initiator for the polymerization of propanesultam chosen from the group consisting of aromatic sulfonyl halides, aliphatic sulfonyl halides, acyl halides, acyl anhydrides, aromatic isocyanates, N-acyl sultams and N-acyl lactams.

7. Fibers from polypropanesultam melting at about 250 to 260° C.

8. Films from polypropanesultam melting at about 250 to 260° C.

9. The process for producing polypropanesultam, which comprises heating 1,3-propanesultam to a temperature in the range of about 25 to 250° C. in the presence of a catalytic amount of a compound chosen from the group consisting of alkali metal and organic quaternary ammonium base salts of 1,3-propanesultam and from 0.005 to 5 mole percent, based on the amount of 1,3-propanesultam present, of an acyl-type initiator for the polymerization of propanesultam chosen from the group consisting of aromatic sulfonyl halides, aliphatic sulfonyl halides, acyl halides, acyl anhydrides, aromatic isocyanates, N-acyl sultams and N-acyl lactoms.

References Cited in the file of this patent
FOREIGN PATENTS 705,427   Great Britain _____ Mar. 10, 1954